US012567927B2

(12) United States Patent
Kuellmer et al.

(10) Patent No.: US 12,567,927 B2
(45) Date of Patent: Mar. 3, 2026

(54) DEVICES AND METHOD FOR GRAPHICAL ANALYSIS OF AN IMPAIRMENT OF A DEMODULATED SIGNAL BASED ON HISTOGRAM TESTING

(71) Applicant: Rohde & Schwarz GmbH & Co. KG, Munich (DE)

(72) Inventors: Alexander Kuellmer, Calw (DE); Oliver Voss, Handeloh (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 304 days.

(21) Appl. No.: 18/219,965

(22) Filed: Jul. 10, 2023

(65) Prior Publication Data

US 2025/0023672 A1    Jan. 16, 2025

(51) Int. Cl.
*G06K 9/00* (2022.01)
*H04L 1/24* (2006.01)
(52) U.S. Cl.
CPC ..................................... *H04L 1/24* (2013.01)
(58) Field of Classification Search
CPC ..................................................... H04N 11/24
USPC ......................................................... 382/167
See application file for complete search history.

(56) References Cited

U.S. PATENT DOCUMENTS

2005/0058341 A1    3/2005  Maruoka

OTHER PUBLICATIONS

Saif, Waddah S., et al. "Separability of histogram based features for optical performance monitoring: An investigation using t-SNE technique." IEEE Photonics Journal 11.3 (2019): 1-12. (Year: 2019).*

Aldaya, Ivan, et al. "Histogram based clustering for nonlinear compensation in long reach coherent passive optical networks." Applied Sciences 10.1 (2020): 152. (Year: 2020).*

Saif, Waddah S., et al. "Optical performance monitoring in mode division multiplexed optical networks." Journal of Lightwave Technology 39.2 (2020): 491-504. (Year: 2020).*

IQ Histogram, 2021, Aaronia Spectran V6 Real Time Spectrum Analyzer Series Support Forum, pp. 1-4 (Year: 2021).*

* cited by examiner

*Primary Examiner* — Jonathan S Lee
(74) *Attorney, Agent, or Firm* — DITTHAVONG, STEINER & MLOTKOWSKI

(57) ABSTRACT

Disclosed are a device (1) for graphical analysis of an impairment of a demodulated signal, and a corresponding process (2). The device comprises a communication interface (11) and a digital processing logic (12). The communication interface (11) is configured for receiving the demodulated signal including in-phase and quadrature, I/Q, symbols (13). The digital processing logic (12) is configured for populating a histogram (14) with a subset of the received I/Q symbols (13) relating to a nominal I/Q symbol (13N) of a graphical pixel-based I/Q symbol constellation (16) of the demodulated signal. The histogram (14) reflects a spread (15) of the subset of the I/Q symbols (13) in the I/Q symbol constellation (16). The spread (15) depends in direction on a type of the impairment and in magnitude on a strength of the impairment. The digital processing logic (12) is further configured for verifying a compliance of a statistical feature (18) of the histogram (14) with a threshold (19). This achieves a higher degree of automation, a higher probability of observing significant transmission errors, and more reliability and higher throughput of measurement.

15 Claims, 4 Drawing Sheets

DEVICES AND METHOD FOR GRAPHICAL ANALYSIS OF AN IMPAIRMENT OF A DEMODULATED SIGNAL BASED ON HISTOGRAM TESTING

TECHNICAL FIELD

The present disclosure relates to measurement technology relating to digital modulation schemes, and in particular to devices and a method for graphical analysis of graphical analysis of an impairment of a demodulated signal.

BACKGROUND ART

Digital modulation may refer to a process of varying one or more properties of a periodic waveform, called a carrier wave, in accordance with digital information to be transmitted. Depending on said digital information to be transmitted and on the varied properties such as amplitude and/or phase, the modulated carrier wave may cycle between a finite set of complex-valued symbols being representative of different binary information snippets (i.e., one or more bits per symbol) to be transmitted. The symbols may collectively form a symbol constellation in the complex plane. A lot of information is immanent to such constellation diagrams as they represent an integral over a certain observation interval.

On the receiving side, the symbols and thus the transmitted binary information snippets may be recovered by way of demodulation/extraction from the modulated carrier wave, and for diagnostic purposes the received symbol constellation may be inspected on an appropriate measurement device.

All conclusions are based on experience and less based on direct measurement parameters. Currently, a judgement if an error occurred or not requires human inspection of such constellation diagrams. Evidently, no continuous observation can take place.

SUMMARY

It is an object to overcome the above-mentioned and other drawbacks. The foregoing and other objects are achieved by the features of the appended independent claims. Preferred embodiments are set forth in the dependent claims and in the following description and drawings.

A first aspect of the present disclosure relates to a device for graphical analysis of an impairment of a demodulated signal. The device comprises a communication interface and a digital processing logic. The communication interface is configured for receiving the demodulated signal including in-phase and quadrature, I/Q, symbols. The digital processing logic is configured for populating a histogram with a subset of the received I/Q symbols relating to a nominal I/Q symbol of a graphical pixel-based I/Q symbol constellation of the demodulated signal. The histogram reflects a spread of the subset of the I/Q symbols in the I/Q symbol constellation. The spread depends in direction on a type of the impairment and in magnitude on a strength of the impairment. The digital processing logic is further configured for verifying a compliance of a statistical feature of the histogram with a threshold.

An impairment as used herein may refer to a degradation of a received demodulated signal by unwanted effects which may reduce the reception quality. Such an impairment may be of a certain type, such as amplitude noise, phase noise and/or other sources of impairments, and have a certain strength (i.e., impact on the reception quality).

A communication interface as used herein may refer to a digital logic for a transfer of information in the form of digital data, such as a digital bitstream or a digitized analog signal. For example, said information may comprise a stream of I/Q symbols of the demodulated signal, or a stream of graphical pixel-based I/Q symbol constellations of the demodulated signal.

A digital processing logic as used herein may refer to a digital logic for processing of digital data based on digital logic and/or arithmetic operations.

Digital modulation as used herein may refer to a process of varying one or more properties such as amplitude and/or phase of a periodic waveform, called a carrier wave, in accordance with digital information to be transmitted. Exemplary digital modulation schemes comprise amplitude shift keying (ASK, such as OOK), phase shift keying (PSK, such as 8-PSK), amplitude/phase shift keying (APSK, such as 16-QAM) and the like.

In-phase and quadrature (I/Q) symbols as used herein may refer to complex-valued discrete symbols of a digital modulation scheme.

An I/Q symbol constellation as used herein may refer to a compilation/rendering of a plurality of I/Q symbols, wherein the complex-valued I/Q symbols are mapped onto a two-dimensional, graphical pixel-based plane.

A histogram as used herein may refer to a representation of a probability/frequency distribution of numerical sample data, wherein a value range of the numerical sample data (e.g., complex-valued I/Q symbols) may be subdivided into consecutive, non-overlapping intervals or faces (e.g., pixels of a graphical pixel-based I/Q symbol constellation) and a quantity/frequency A of the numerical sample values falling into each interval (i.e., a hit frequency of each pixel) is determined.

A spread as used herein may refer to an actual expansion of a plurality of I/Q symbols around corresponding nominal I/Q symbols in the two-dimensional, graphical pixel-based plane of the I/Q symbol constellation. Such a spread may have a (preferential) direction, such as omnidirectional, radial, or circumferential, and may have a magnitude (stretch, dimension) in said direction.

The demodulated signal may comprise a baseband signal being extracted from a radio frequency, RF, or optical carrier wave.

A radio frequency (RF) as used herein may refer to a frequency range roughly between an upper limit of audio frequencies (around 20 kHz) and around 300 GHz at which an electromagnetic field can radiate off a conductor into space as a radio wave, thereby forming an RF signal. An optical frequency as used herein may refer to a frequency (or wavelength) range roughly between around 300 GHz (0.1 cm) and 3 PHz (0.1 μm).

The impairment may originate from a transmitter, a channel and/or a receiver of the carrier wave.

The type of the impairment may comprise one or more of: amplitude noise, phase noise, dispersion, distortion, cross-talk, and gain imbalance.

The spread may extend omni-directionally in the I/Q symbol constellation.

The spread may extend in a radial direction of the I/Q symbol constellation, if the type of impairment comprises the amplitude noise.

The spread may extend in a circumferential direction of the I/Q symbol constellation, if the type of impairment comprises the phase noise.

The strength of the impairment may depend on one of: an error vector magnitude, EVM, value, a bit error ratio, BER, value, a symbol error ratio, SER, value, and a signal-to-noise ratio, SNR, value.

An error vector magnitude (EVM) as used herein may refer to a measure of deviation of an actual I/Q symbol from a corresponding reference I/Q symbol in the complex plane.

A bit error ratio (BER) as used herein may refer to a ratio of a number of received bit errors and a total number of received bits during a time interval.

A symbol error ratio (SER) as used herein may refer to a ratio of a number of received I/Q symbol errors and a total number of received I/Q symbols during a time interval.

A signal-to-noise ratio (SNR) as used herein may refer to a ratio of a signal power to a noise power of a received demodulated signal.

The statistical feature of the histogram may comprise one of: a sample variance of the histogram, and a sample standard deviation of the histogram.

A sample variance and a sample standard deviation as used herein are measures of dispersion of the sample values put into the histogram around their sample mean.

The digital processing logic may further be configured for identifying the direction of the spread based on a given hypothesis of a root cause of the impairment of the demodulated signal.

The digital processing logic may further be configured for confining the spread of the subset of the I/Q symbols in the I/Q symbol constellation to the threshold for the statistical feature of the histogram based on a given analog or digital filter.

The given filter may comprise one or more of: a video bandwidth filter, a low-pass filter, a band-pass filter, a high-pass filter, and a digital symbol filter.

The communication interface may comprise one of: a universal serial bus, USB, interface, a local area network, LAN, interface, and a digital video interface.

Universal serial bus (USB) and local area network (LAN) as used herein may respectively refer to industry standards that establish, inter alia, protocol specifications for interfacing (i.e., connection, communication and power supply) between computers, peripherals and other devices such as measurement systems. A digital video interface as used herein may refer to a digital logic for digital communication of video signals, such as a High-Definition Multimedia Interface (HDMI), DisplayPort, and the like.

The digital processing logic may comprise one or more of: an application-specific integrated circuit, ASIC, a field-programmable gate array, FPGA, a digital signal processor, DSP, a central processing unit, CPU, and a graphics processing unit, GPU.

The device may further comprise a digital memory for maintaining the histogram of the subset of the received I/Q symbols relating to the nominal I/Q symbol.

A digital memory as used herein may particularly refer to a solid-state random-access memory (RAM).

A second aspect of the present disclosure relates to a process of graphical analysis of an impairment of a radio frequency, demodulated, signal. The process comprises receiving the demodulated signal including in-phase and quadrature, I/Q, symbols. The process further comprises populating a histogram with a subset of the received I/Q symbols relating to a nominal I/Q symbol of a graphical pixel-based I/Q symbol constellation of the demodulated signal The histogram reflects a spread of the subset of the I/Q symbols in the I/Q symbol constellation. The spread depends in direction on a type of the impairment and in magnitude on a strength of the impairment. The process further comprises verifying a compliance of a statistical feature of the histogram with a threshold.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
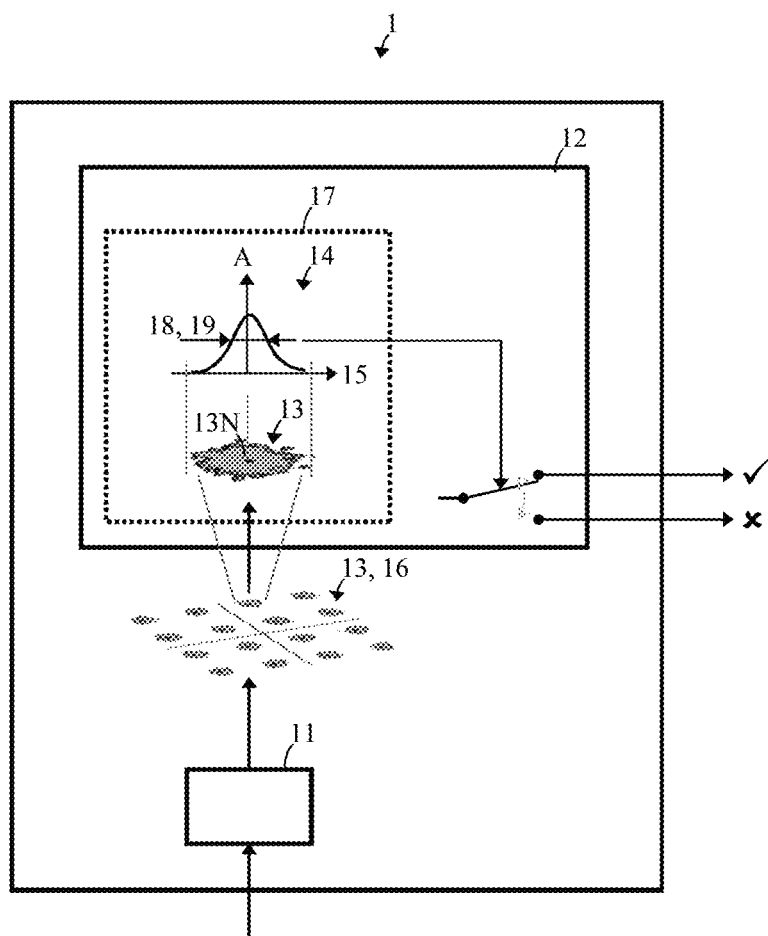

The drawings are to be regarded as being schematic representations, and elements illustrated in the drawings are not necessarily shown to scale. Rather, the various elements are represented such that their function and general purpose become apparent to those skilled in the art.

Throughout the present disclosure, expressions such as 'configured for (do)ing' and 'configured to (do)' may refer to a same limitation.

Figures 2, 3, 4:
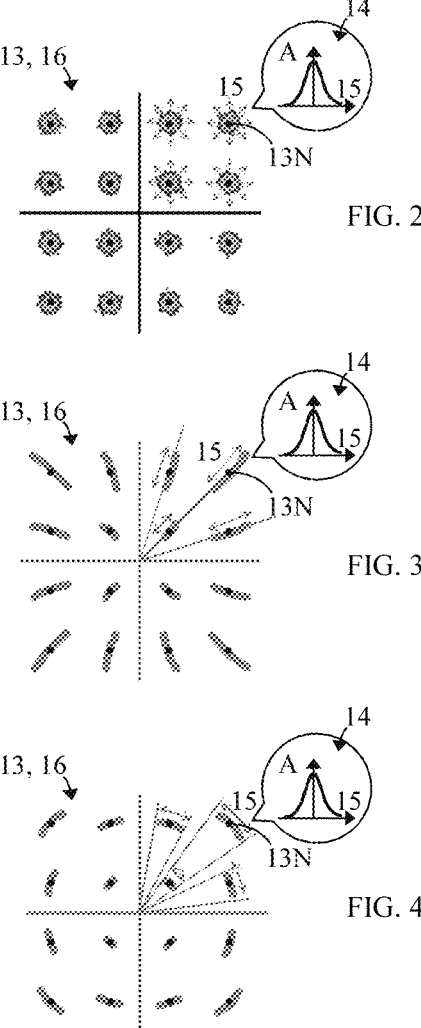
Figures 5, 6, 7:
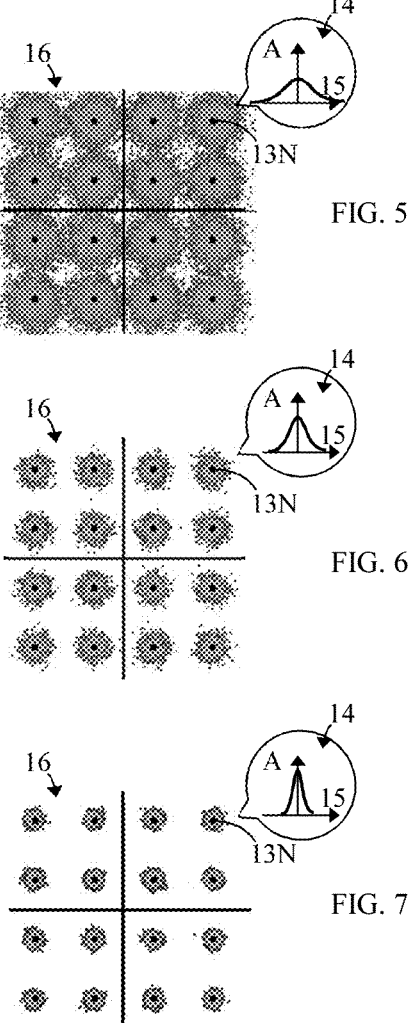
Figure 8:
Figure 8:
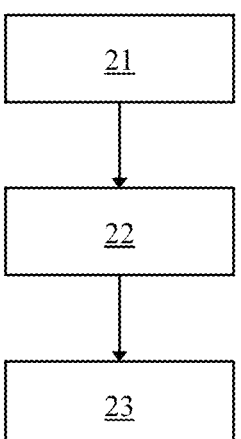

FIG. 1 illustrates a device for graphical analysis of an impairment of a demodulated signal in accordance with the present disclosure;

FIGS. 2-4 illustrate exemplary I/Q symbol constellations of the demodulated signal for various impairments of the demodulated signal;

FIGS. 5-7 illustrate progressively confined I/Q symbols of the demodulated signal; and FIG. 8 illustrates a process for graphical analysis of an impairment of a demodulated signal in accordance with the present disclosure.

DETAILED DESCRIPTIONS OF DRAWINGS

FIG. 1 illustrates a device 1 for graphical analysis of an impairment of a demodulated signal in accordance with the present disclosure.

The demodulated signal may comprise a baseband signal being extracted from a radio frequency (RF) or optical carrier wave.

The impairment may originate from a transmitter, a channel and/or a receiver of the carrier wave.

The device 1 comprises a communication interface 11.

The communication interface 11 may comprise one of a universal serial bus (USB) interface, a local area network (LAN) interface, and a digital video interface such as a HDMI or DisplayPort interface, or any other appropriate communication interface.

The communication interface 11 is configured for receiving the demodulated signal including in-phase and quadrature (I/Q) symbols 13.

More specifically, in case of the USB or LAN interface, the communication interface 11 is configured to receive a stream of the I/Q symbols 13 of the demodulated signal, whereas in case of the digital video interface, the communication interface 11 is configured to receive a stream of graphical pixel-based I/Q symbol constellations 16 of the demodulated signal.

The device 1 further comprises a digital processing logic 12.

The digital processing logic 12 may comprise one or more of an application-specific integrated circuit (ASIC), a field-programmable gate array (FPGA), a digital signal processor (DSP), a central processing unit (CPU), and a graphics processing unit (GPU).

The digital processing logic 12 is configured for populating a histogram 14 with a subset of the received I/Q symbols 13 relating to a nominal I/Q symbol 13N of a graphical pixel-based I/Q symbol constellation 16 of the demodulated signal. The histogram 14 reflects a spread (or distribution) of the subset of the I/Q symbols 13 in the I/Q symbol constellation 16, wherein the spread 15 depends in direction on a type of the impairment and in magnitude on a strength of the impairment. Note that such a histogram 14 may be maintained for the respective nominal I/Q symbol 13N of the demodulated signal.

The device 1 may further comprise a digital memory 17 for maintaining the histogram 14 of the subset of the received I/Q symbols 13 relating to the nominal I/Q symbol 13N, no matter if the subset is received as part of the graphical pixel-based I/Q symbol constellation 16 via the digital video interface or received as I/Q symbols 13 via the USB or LAN (or similar) interface.

The digital processing logic 12 is further configured for verifying a compliance of a statistical feature 18 of the histogram 14 with a threshold 19.

In FIG. 1, the verification is symbolically indicated by a switch symbol which may toggle between a compliance state (indicated by a '✓' check mark) and a non-compliance state (indicated by an '×' mark) in response to the thresholding.

The adaptation of histograms to I/Q constellation diagram testing gives the chance to automatically detect if received signals are within a defined interval or not over long periods and in addition how often a violation occurs.

This may lead to a higher probability of capturing rarely occurring violations, decrease the human factor of recognizing rare events that are out of bounds, which especially becomes hard to tell when higher QAM grades are used, as many constellation points would have to be observed in parallel.

In addition this time consuming measurement can be done without the need of having an operator sitting in front of the instrument.

In summary, a higher degree of automation, a higher probability of observing significant transmission errors, and more reliability and higher throughput for such analysis may be achieved. In addition, a continuous monitoring system may be established.

FIGS. 2-4 illustrate exemplary EQ symbol constellations 16 of the demodulated signal for various impairments of the demodulated signal.

In this example, the I/Q symbol constellations 16 relate to a 16-QAM digital modulation scheme.

In particular, the type of the impairment may comprise one or more of: amplitude noise, phase noise, dispersion, distortion, crosstalk, gain imbalance, or any other sources of impairments.

In accordance with any of the types of impairment, the digital processing logic 12 is configured for populating a histogram 14 with the subset of the received I/Q symbols 13 relating to the nominal EQ symbol 13N of a graphical pixel-based EQ symbol constellation 16 of the demodulated signal. The nominal I/Q symbol 13N may be selected randomly or by an operator. The histogram 14 reflects a spread 15 of the subset of the I/Q symbols 13 in the EQ symbol constellation 16, wherein the spread 15 depends in direction on a type of the impairment and in magnitude on a strength of the impairment.

In particular, the strength of the impairment (and thus the magnitude, stretch, or dimension) in said direction(s) may depend on one of: an error vector magnitude, EVM, value, a bit error ratio, BER, value, a symbol error ratio, SER, value, and a signal-to-noise ratio, SNR, value.

The respective histogram 14 may thus count a frequency of an offset of the received I/Q symbols 13 of the considered subset relative to the nominal I/Q symbol 13N along one direction (FIGS. 2-4) or even along more directions (FIG. 2 only) of the spread 15. In other words, the respective histogram 14 may count how often the pixels around said nominal I/Q symbol 13N of the graphical I/Q symbol constellation 16 are hit by the received I/Q symbols 13 of the considered subset.

In accordance with FIG. 2, the spread 15 may extend omni-directionally in the I/Q symbol constellation 16.

In accordance with FIG. 3, wherein the type of impairment comprises the amplitude noise, the spread 15 may extend in a radial direction of the I/Q symbol constellation 16.

In accordance with FIG. 4, wherein the type of impairment comprises the phase noise, the spread 15 may extend in a circumferential direction of the I/Q symbol constellation 16.

The digital processing logic 12 may further be configured for identifying the direction of the spread 15 based on a given hypothesis of a root cause of the impairment of the demodulated signal.

Depending on the circumstances, the type of impairment may not be monocausal, so that the spread 15 may in turn depend in direction on multiple root causes. For example, the spread 15 may extend in the radial direction as well as in the circumferential direction, if the type of impairment comprises the amplitude noise as well as the phase noise. In such a case, populating a histogram 14 for each of the above directions may be appropriate to achieve the above-mentioned advantages in view of the multiple types of impairment.

FIGS. 5-7 illustrate progressively confined I/Q symbols 13 of the demodulated signal.

To this end, the digital processing logic 12 may further be configured for confining the spread 15 of the subset of the I/Q symbols 13 in the I/Q symbol constellation 16 to the threshold 19 for the statistical feature 18 of the histogram 14 based on a given analog or digital filter.

The given filter algorithm may comprise one or more of: a video bandwidth filter, a low-pass filter, a band-pass filter, a high-pass filter, and a digital symbol filter.

The statistical feature 18 of the histogram 14 may comprise one of: a sample variance of the histogram 14, and a sample standard deviation of the histogram 14. Note that a small (large) magnitude of the spread 15 of the considered subset of the I/Q symbols 13 typically coincides with a small (large) sample variance or sample standard deviation of the histogram 14. As such, the spread 15 may be assessed numerically.

In accordance with FIG. 5, the spread 15 of the subset of the I/Q symbols 13 of the demodulated signal has not been confined with respect to the threshold 19. The resulting histogram 14 reflects that the spread 15 of the subset of the I/Q symbols 13 in the I/Q symbol constellation 16 has a large magnitude. The above-mentioned statistical feature 18 of the histogram 14, for instance the sample variance or the sample standard deviation, may most likely not be in compliance with (i.e., fall below) the threshold 19.

In accordance with FIG. 6, the spread 15 of the subset of the I/Q symbols 13 of the demodulated signal has been confined with respect to the threshold 19 to a reduced magnitude (cf. FIG. 5 above). Said statistical feature 18 may likely be in compliance with the threshold 19 already.

In accordance with FIG. 7, the spread 15 of the subset of the I/Q symbols 13 of the demodulated signal has been confined even more (cf. FIG. 6 above). Said statistical feature 18 of the histogram 14 may almost certainly be in compliance with the threshold 19.

FIG. 8 illustrates a process 2 for graphical analysis of an impairment of a demodulated signal in accordance with the present disclosure.

The process 2 comprises receiving 21 in-phase and quadrature, I/Q, symbols 13 of the demodulated signal.

The process 2 further comprises populating 22 a histogram 14 with a subset of the received I/Q symbols 13 relating to a nominal I/Q symbol 13N of a graphical pixel-based I/Q symbol constellation 16 of the demodulated signal The histogram 14 reflects a spread 15 of the subset of the I/Q symbols 13 in the I/Q symbol constellation 16. The spread 15 depends in direction on a type of the impairment and in magnitude on a strength of the impairment.

The process 2 further comprises verifying 23 a compliance of a statistical feature 18 of the histogram 14 with a threshold 19.

The invention claimed is:

1. A device for graphical analysis of an impairment of a demodulated signal, comprising a communication interface for receiving the demodulated signal including in-phase and quadrature, I/Q, symbols; and a digital processing logic for populating a histogram with a subset of the received I/Q symbols relating to a nominal I/Q symbol of a graphical pixel-based I/Q symbol constellation of the demodulated signal, the histogram reflecting a spread of the subset of the I/Q symbols in the I/Q symbol constellation, the spread depending in direction on a type of the impairment and in magnitude on a strength of the impairment;

verifying a compliance of a statistical feature of the histogram with a threshold; and confining the spread of the subset of the I/Q symbols in the I/Q symbol constellation to the threshold for the statistical feature of the histogram based on a given analog or digital filter.

2. The device of claim 1, the demodulated signal comprising a baseband signal being extracted from a radio frequency, RF, or optical carrier wave.

3. The device of claim 2, the impairment originating from a transmitter, a channel and/or a receiver of the carrier wave.

4. The device of claim 3, the type of the impairment comprising one or more of:

amplitude noise, phase noise, dispersion, distortion, crosstalk, and gain imbalance.

5. The device of claim 4, the spread extending omni-directionally in the I/Q symbol constellation.

6. The device of claim 4, the spread extending in a radial direction of the I/Q symbol constellation, if the type of impairment comprises the amplitude noise.

7. The device of claim 4, the spread extending in a circumferential direction of the I/Q symbol constellation, if the type of impairment comprises the phase noise.

8. The device of claim 1, the strength of the impairment depending on one of:

an error vector magnitude, EVM, value, a bit error ratio, BER, value, a symbol error ratio, SER, value, and a signal-to-noise ratio, SNR, value.

9. The device of claim 1, the statistical feature of the histogram comprising one of:

a sample variance of the histogram, and a sample standard deviation of the histogram.

10. The device of claim 1, the digital processing logic further being configured for identifying the direction of the spread based on a hypothesis of a root cause of the impairment of the demodulated signal.

11. The device of claim 1, a video bandwidth filter, a low-pass filter, a band-pass filter, a high-pass filter, and a digital symbol filter.

12. The device of claim 1, the communication interface comprising one of:

a universal serial bus, USB, interface, a local area network, LAN, interface, and a digital video interface.

13. The device of claim 1, the digital processing logic comprising one or more of:

an application-specific integrated circuit, ASIC, a field-programmable gate array, FPGA, a digital signal processor, DSP, a central processing unit, CPU, and a graphics processing unit, GPU.

14. The device of claim 1, further comprising a digital memory for maintaining the histogram of the subset of the received I/Q symbols relating to the nominal I/Q symbol.

15. A process of graphical analysis of an impairment of a demodulated signal, the process comprising receiving the demodulated signal including in-phase and quadrature, I/Q, symbols;

populating a histogram with a subset of the received I/Q symbols relating to a nominal I/Q symbol of a graphical pixel-based I/Q symbol constellation of the demodulated signal, the histogram reflecting a spread of the subset of the I/Q symbols in the I/Q symbol constellation, the spread depending in direction on a type of the impairment and in magnitude on a strength of the impairment;

verifying a compliance of a statistical feature of the histogram with a threshold; and confining the spread of the subset of the I/Q symbols in the I/Q symbol constellation to the threshold for the statistical feature of the histogram based on a given analog or digital filter.

* * * * *